April 8, 1941.  L. BUNIN  2,237,751
IMAGE FOR MAKING ANIMATED MOVING PICTURES
Filed May 24, 1939
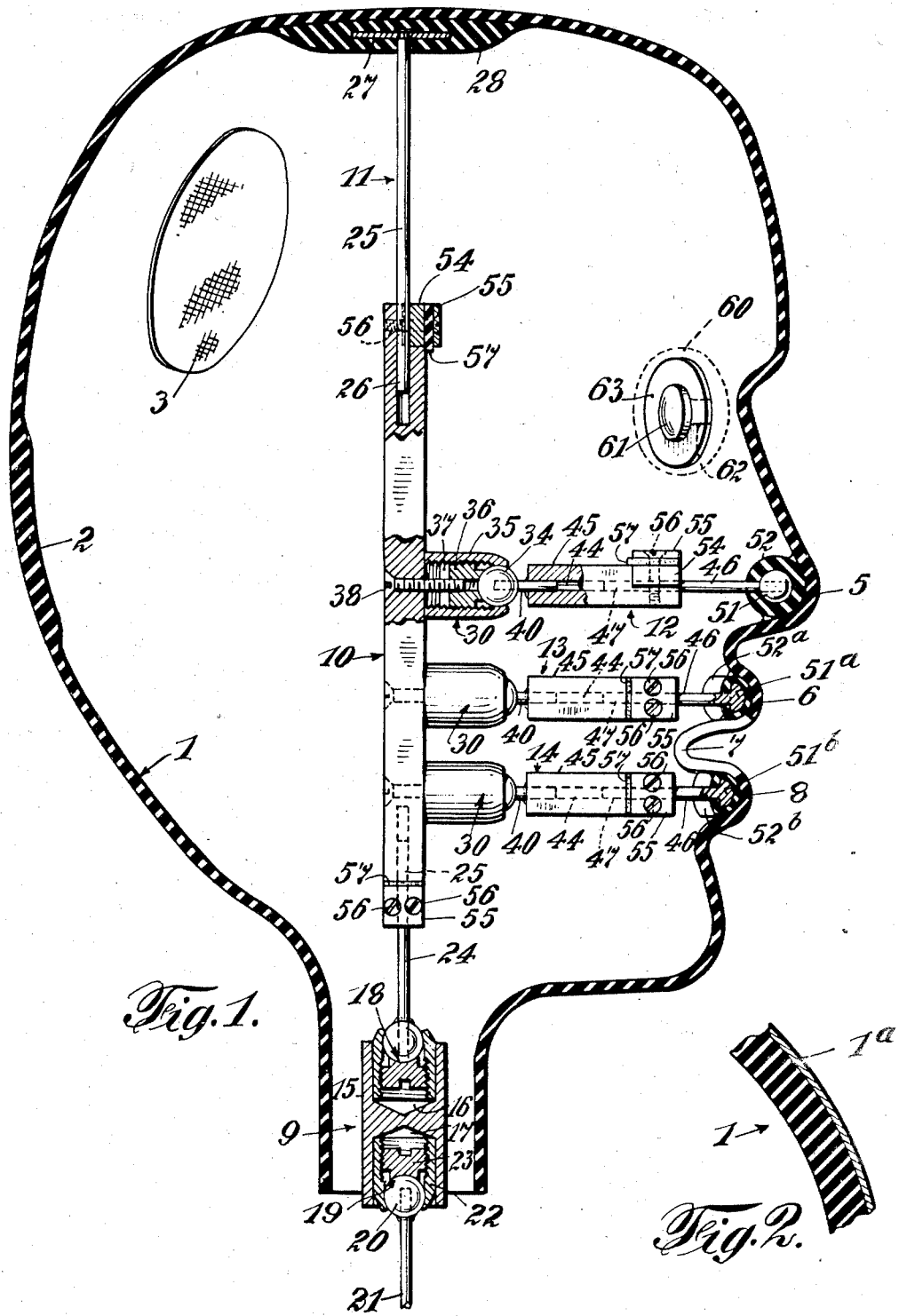
INVENTOR.
Louis Bunin
BY
Ramsey, Kent, Chisholm & Lutz
his ATTORNEYS Patented Apr. 8, 1941

2,237,751

UNITED STATES PATENT OFFICE 2,237,751

IMAGE FOR MAKING ANIMATED MOVING PICTURES

Louis Bunin, New York, N. Y.

Application May 24, 1939, Serial No. 275,563

14 Claims. (Cl. 46—135)

This invention relates to animated moving pictures and, more particularly, to a three dimensional image for making such moving pictures by stop-motion technique. The invention is particularly applicable to the production of motion pictures in color.

In making motion pictures by stop-motion technique, a series of increments of motion are effected, and one frame of the moving picture is taken (as a still picture) for each increment of movement or motion. In the case of animated cartoons, the successive increments of movement or motion are obtained by successive drawings, which are set up and photographed one at a time on the successive frames of the film. The procedure is, of course, expensive and time consuming due to the large number of different drawings required and to the rather severe limits upon reuse of any one drawing in subsequent frames of the film.

Various attempts have been made to improve on the animated cartoon by using distortable three dimensional figures as the images to be photographed. A successful use of such distortable images would be quite an advance in the art. The quality of the film would be improved by the third dimension of the images being photographed; and there would be a great saving due to the reduction in the number of different images required for making a film. However, the attempts that have been made along this line have been only partially successful. The images used have not provided a desirably large range of distortion; nor have they accurately retained their successive adjusted conditions to produce the successive increments of motion or change of expression. Also special difficulties have been encountered in attempting to produce colored pictures with such images. The images used are only a few inches tall, whereas the projected picture is usually a number of feet tall. Thus, any surface blemishes on the image are greatly magnified in the projection of the picture and may render the film unsalable. For the taking of pictures in colors, the problem is aggravated by the magnification of any blemishes in the coloring or make-up of the image. Furthermore, where a single image is used throughout a motion picture, the image must be handled and distorted tens, or even hundreds, of thousands of times in adjusting it for the various frames of the picture. Any change in the shade of the make-up of the image, or cracking of the paint, or any dirt which accumulates on the image during these manifold manipulations of the image is exceedingly detrimental to the film, because of the great magnification upon projection of the film.

The general object of the present invention is to provide for stop-motion technique a three dimensional image which will eliminate the prior art difficulties outlined above.

Another object of the invention is to provide for stop-motion technique a distortable image having a wide range of distortion and adjustment and having colored make-up which will not be impaired by such wide range of distortion and adjustment.

An additional object of the invention is to provide for stop-motion technique a distortable image having washable make-up which will retain its surface and color characteristics during the many thousands of handlings and manipulations required in the making of a film.

A further object of the invention is to provide for stop-motion technique an image having such a wide range of stretching and distortion characteristics that a greatly reduced number of images are required for the production of a motion picture, and a wide range of mutations can be simulated in the picture.

A still further object of the invention is to provide for stop-motion technique a distortable image which will accurately retain the various adjusted states imparted to it for the successive frames of the picture.

Various additional and detailed objects of the invention will be apparent from the accompanying disclosure.

Fig. 1 of the drawing is an enlarged, somewhat diagrammatic, view showing in central vertical section a head embodying the present invention. For the sake of clarity certain interior parts are shown in elevation.

Fig. 2 is a detailed sectional view showing a section of the envelope and the make-up film.

A molded rubber envelope 1 is made in any desired shape, with any desired facial characteristics such as ears, nose and lips. This envelope may be of uniform thickness where it is desired to have uniform stretching or distortion characteristics. However, the distortion or stretching characteristics can be locally varied throughout the envelope as by appropriately located thick areas, one of which is indicated at 2. Also, stretching may be substantially eliminated in desired local areas by applying to the interior of the envelope suitable non-stretching patches such as 3. These patches may be made of rubberized cloth, which is cemented or vulcanized to the interior of the envelope 1. The particular envelope shown includes, inter alia, a nose 5, an upper lip 6, a mouth 7, and a lower lip 8.

Located within the envelope is a metal mechanism for applying distorting forces to various portions of the envelope 1 and retaining the envelope in distorted, or adjusted, condition. The particular mechanism shown includes a supporting and coupling assembly 9, a vertical standard 10, and adjustment units 11, 12, 13 and 14 connected to various portions of envelope 1.

The coupling assembly 9 includes a vertical cylindrical piece of metal 15 having coaxial sockets 16 and 17 in its upper and lower ends, respectively. The sockets are adapted to receive and frictionally retain ball bearing units designated as a whole by 18 and 19, respectively. Bearing unit 19 includes a metal ball 20 fixedly mounted upon a rod 21 projecting from the upper portion of a torso on which the head is to be mounted. The ball 20 is journalled in the constricted end of an internally threaded tubular section 22. A screw plug 23 adjustably engages the surface of the ball 20 to complete a ball-and-socket joint having sufficient friction to stay in any adjusted position to which it may be moved. In changing heads on the torso, the ball bearing unit 19 (elements 20, 22 and 23) is merely withdrawn as a whole from socket 17. The details of ball bearing unit 18 are the same as those of ball bearing unit 19; and unit 18 may be similarly withdrawn from socket 16. To the ball of bearing unit 18 there is fixedly attached a vertical rod 24 which telescopically connects at 25 with standard 10.

Adjustment unit 11 includes a rod 25, the lower end of which is telescopically associated at 26 with the upper end of standard 10. To the upper end of rod 25 there is affixed a metal plate 27, about which is molded a suitably shaped mass of rubber 28. Rubber mass 28 is vulcanized, or cemented, to the interior of envelope 1 at the position shown.

Adjustment units 12, 13 and 14 are all similar, so only unit 12 will be described in detail. On the drawing the same reference characters are used to designate identical parts in each of units 12, 13 and 14.

Adjustment unit 12 includes a ball-and-socket unit 30 affixed to standard 10. Joint unit 30 is shown as comprising a metal ball 34 held in the constricted end of tubular section 35, which is internally threaded. A screw plug 36, having a screw-driver slot 37, makes adjustable frictional contact with the ball 34. The screw plug 36 is also centrally apertured and threaded to receive a screw 38 which passes through strut 10 and rigidly secures the ball-and-socket joint 30 to the strut.

Entering the ball 34 is one end of a rod 40, which is soldered or otherwise suitably secured to the ball. The other end of rod 40 enters a central bore 44 in a rectangular metal bar 45; and the rod 40 is soldered or otherwise secured to the bar 45. At 41 there is a telescopic connection between bar 45 and rod 46, which will be referred to later. Fixedly secured to the outer end of rod 46 is an enlarged metal member 51 of suitable shape (e. g. a sphere) about which is molded a mass of rubber 52. The rubber 52 is vulcanized, or cemented, to the interior of the nose portion 5 of the envelope 1. The rods 46, 46 of adjustment units 13 and 14 have their outer ends provided with enlarged metal members 51ª and 51ᵇ respectively, of suitable shape for attachment to the lips. Members 51ª and 51ᵇ may, for example, be crescent shaped and may be of flexible armature material so that the curvature of the lips can be adjusted and maintained. Molded about members 51ª and 51ᵇ are masses of rubber 52ª and 52ᵇ respectively; and these are vulcanized, or cemented, to lip portions 6 and 8, respectively, of the image.

The telescopic connections at 25, 26, 41, 41, and 41 are all the same and the same reference characters are used to designate identical parts. As the telescoping rod enters the bore it is gripped laterally by a grooved friction block 54 which maintains the rod in any telescopic position to which it may be moved. Pressure is applied to friction block 54 by a pressure plate 55, secured by two screws 56, 56. Adequate resiliency is provided by a layer of rubber 57 interposed between the friction block 54 and the pressure plate 55.

In conjunction with the rubber envelope, suitably attached eyes, ears and tongue may be used. At 60 there is indicated an eye located on the outside of the envelope 1. This eye may be made of metal or suitably molded material, and it is suitably painted. I have found that eyes may be conveniently attached to the envelope by securing to their under surface the large end of an ordinary collar button. The small end of the collar button, indicated at 61, is then forced through a small hole in the envelope so that the rubber of the envelope frictionally engages the shank 62 of the collar button. Preferably, a soft rubber washer 63 is also forced over the small end 61 and onto the shank 62 which it frictionally grips. With this construction the eyes can be rotated and they are retained in any adjusted rotative position.

I have found that a suitable tongue can be made by molding red rubber about a strip of fine copper screening such as is used for fine mesh sieves. Preferably, the screening is annealed and plated before being embedded in latex, which is vulcanized to form a coherent laminated mass. The plating should be done with a suitable metal which is not attacked by ingredients of the rubber. Nickel and tin are suitable metals for the purpose. Such a tongue can be pushed in and out of the mouth to give any desired tongue projection; and it can be bent into various curvatures, which it will retain. For the production of special animated, crumpling effects, screening may be similarly incorporated in part or all of the envelope constituting the image itself.

The envelope 1 may be made by first sculpturing an image into the form desired. From this sculptured image a plaster mold or matrix is made. Where it is desired to have a thick spot such as 2 in the image, a corresponding layer of latex is applied to the inner surface of the mold. The mold is then filled with latex; and I prefer to use a so-called self-vulcanizing latex. The mold apparently absorbs liquid from the latex, since the latex, upon standing in the mold an appropriate length of time, will form on the surface of the mold a congealed envelope such as envelope 1. After the envelope has formed to the desired thickness, the remainder of the latex is drained from the mold; and as soon as the envelope has lost its stickiness to a sufficient extent, the envelope may be stripped from the mold. If ordinary latex is used, the mold should be heated before stripping to vulcanize the envelope.

To provide the image with make-up, I take latex (preferably the same so-called self-vulcanizing latex), and grind into it pigment to give it the desired color. Of course, various batches of pigmented latex are required to produce the various colors and tones required for the entire image. This pigmented latex I thin with distilled water and apply to the exterior surface of the envelope 1 with a small spray gun or air brush. This produces a film 1ᵃ (Fig. 2) which is permanently united with the envelope 1 and which has the color diffused through the thickness of the film. This make-up film has the same stretching and distortion characteristics as the rubber envelope 1 itself, but I prefer to make the envelope 1 of a color which harmonizes with the general scheme of the make-up. For example, if the image were to be a negro, I would make the envelope 1 of blackish rubber. If the make-up were to be various shades of green, I would use an intermediate shade of green for envelope 1.

By the term "rubber" I do not limit myself to natural rubbers, but include artificial rubbers as well. Within the term "ball-and-socket joint" I include joints having the movement of a conventional ball-and-socket joint, regardless of whether a ball is used in the joint.

A wide range of shaping, adjustment, and distortion, of the image is possible; and the image automatically retains its adjusted position for the exposure of a frame of the moving picture film. All sorts of tilting effects of the head in any direction can be obtained by ball-and-socket joints 18 and 20. Ball-and-socket joints 30, 30 and 30 permit swinging of the nose and lips both separately and in unison, in any desired direction, upwardly, downwardly, or sidewise. Telescopic connections at 25 and 26 provide for stretching of the neck and the top of the head. Telescopic connections at 47, 47 and 47 provide stretching and projection of the nose and lips.

The pigmented latex film 1ᵃ does not crack or lose its surface characteristics under even very extreme stretching or distortion. Furthermore, the stretching does not change the tone of the color, due to the depth of the pigmentation. Additionally, the latex film 1ᵃ can be washed as often as desired during the production of a moving picture, thereby preventing difficulty due to dirt and grease resulting from handling and manipulation of the image. Additionally, the latex film 1ᵃ is smooth so that no flaws are produced in the picture by any desirable amount of magnification in projecting the picture.

While the construction shown provides for interchange of heads upon a single body, the range of distortion and adjustment of any one head is so great that very few heads are required for even extensive mutations such as the mutation of a cabbage or carrot into the head of an animal or person or vice versa.

In actual practice it has been found that the present invention provides for marked economy in the production of stop-motion pictures and makes possible new mutations and effects.

In compliance with the patent statutes I have disclosed the best form in which I have contemplated applying my invention, but it will be understood that the disclosure is illustrative and not limiting. The same principles are utilized in images other than human heads, e. g. in images such as worms, animals, bugs, fanciful characters, and inanimate objects. However, the necessary changes in form and arrangement must be made in adapting the invention to a particular image.

What is claimed is:

1. In the art of motion pictures, a three dimensional image for producing animated colored pictures by stop-motion technique, said image comprising: a hollow rubber envelope having a wall of varying thickness, a colored rubber film of make-up on and attached to the outer surface of the envelope, and adjustable mechanism within the envelope to maintain local portions of the envelope in distorted condition, said mechanism being operatively adjustable by grasping the exterior of the envelope and distorting it to the desired shape.

2. In the art of motion pictures, a three dimensional image for producing animated colored pictures by stop-motion technique, said image comprising: a hollow rubber envelope having a wall of varying thickness, a colored rubber film of make-up on and attached to the outer surface of the envelope, and mechanism within the envelope and operative to apply stretching and distorting forces to local portions of the envelope, said mechanism comprising ball-and-socket joints and sliding connections from the joints to portions of the envelope, said sliding connections having friction means to automatically secure them in adjusted position.

3. In the art of motion pictures, a three dimensional image for producing animated colored pictures by stop-motion technique, said image comprising: a hollow rubber envelope, a colored rubber film of make-up on and attached to the outer surface of the envelope, and adjustable mechanism within the envelope to maintain local portions of the envelope in distorted condition, said mechanism being operatively adjustable by grasping the exterior of the envelope and distorting it to the desired shape.

4. In the art of motion pictures, a three dimensional image for producing animated pictures by stop-motion technique, said image comprising: a hollow rubber envelope, and mechanism within the envelope and operative to apply stretching and distorting forces to local portions of the envelope, said mechanism comprising ball-and-socket joints and sliding connections from the joints to portions of the envelope, both said joints and said sliding connections having friction means to automatically secure them in adjusted position.

5. In the art of motion pictures, a three dimensional image for producing animated colored pictures by stop-motion technique; said image comprising: a hollow rubber envelope; a colored rubber film of make-up on and attached to the outer surface of the envelope; and mechanism within the envelope and operative to apply stretching and distorting forces to local portions of the envelope, said mechanism comprising a standard within the envelope, a sliding connection from the top of the standard to the top of the envelope, and a plurality of direct-pull sliding connections from the side of the standard to other portions of the envelope, said plurality of sliding connections being adjustable from the exterior of the envelope and having friction means to automatically secure them in adjusted position.

6. In the art of motion pictures, a three dimensional image for producing animated pictures by stop-motion technique, said image comprising: a hollow rubber envelope in the form of a head and neck; and mechanism within the envelope and operative to apply stretching and distorting forces to local portions of the envelope, said mechanism comprising a connecting unit in the neck to attach the head to a body, a ball-and-socket joint incorporated in the connecting unit, a standard within the head, a sliding connection between said ball-and-socket joint and said standard, a plurality of other ball-and-socket joints attached to said standard, and sliding connections from said other ball-and-socket joints to areas of the envelope.

7. In the art of motion pictures, a three dimensional image for producing animated pictures by stop-motion technique, said image comprising a hollow rubber envelope having a wall of varying thickness and having means associated therewith to render local areas non-stretching, and adjustable mechanism to maintain other local areas of the envelope in stretched and distorted condition, said mechanism being operatively adjustable by grasping the exterior of the envelope and stretching and distorting it to the desired shape.

8. In the art of motion pictures, a three dimensional image for producing animated colored pictures by stop-motion technique, said image comprising: a hollow rubber envelope, a colored rubber film of make-up on and attached to the outer surface of the envelope, and adjustable means within the envelope to maintain distortion imparted to local portions of the envelope, said means being operatively adjustable by grasping the exterior of the envelope and distorting it to the desired shape.

9. In the art of motion pictures, a three dimensional image for producing animated pictures by stop-motion technique, said image comprising: a hollow rubber envelope, and adjustable mechanism within the envelope to maintain distortion imparted to local portions of the envelope, said mechanism being operatively adjustable by grasping the exterior of the envelope and distorting it to the desired shape, and said mechanism including means to automatically maintain it in adjusted condition.

10. In the art of motion pictures, a three dimensional image for producing animated pictures by stop-motion technique, said image comprising: a hollow rubber envelope, and adjustment mechanism within the envelope, said mechanism including an adjustable rigid connection to a local portion of the envelope, and a non-resilient deformable metal member operatively incorporated in said local portion, whereby the rigid connection maintains said local portion of the envelope in adjusted position and the deformable member maintains such local portion in adjusted shape.

11. An image as in claim 10 in which the rigid connection is operatively adjustable by grasping the exterior of the envelope and moving the local portion of the envelope to the desired position.

12. An image as in claim 10 in which the rigid connection is operatively adjustable by grasping the exterior of the envelope and moving the local portion of the envelope to the desired position, the rigid connection also including means to automatically retain it in adjusted condition.

13. An image as in claim 10 in which the rigid connection includes a telescopic member and a ball-and-socket joint.

14. In the art of motion pictures, a three dimensional image for producing animated pictures by stop-motion technique, said image comprising: an unfilled rubber envelope adapted to be bulged in and out throughout a wide range, and a non-resilient deformable metal member operatively incorporated in at least a portion of the envelope layer, whereby the member maintains the shape imparted to such portion of the envelope.

LOUIS BUNIN.